(12) United States Patent
Johnson et al.

(10) Patent No.: US 6,719,362 B1
(45) Date of Patent: Apr. 13, 2004

(54) INTEGRATED LOWER COWL/PLENUM AND WIPER DRIVE MODULE

(75) Inventors: Lyn Johnson, Troy, MI (US); Boon-Sam Tan, Swartz Creek, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/286,130

(22) Filed: Oct. 31, 2002

(51) Int. Cl.$^7$ ................................................ B62D 25/08
(52) U.S. Cl. ..................................... 296/192; 296/96.15
(58) Field of Search ............................ 296/192, 96.15; 15/250.31, 250.3

(56) References Cited

U.S. PATENT DOCUMENTS

| | | | |
|---|---|---|---|
| 2,643,909 A | 6/1953 | Foster | |
| 3,264,670 A | 8/1966 | Barenyi et al. | |
| 3,604,048 A | 9/1971 | Mainka | |
| 4,028,950 A | 6/1977 | Osterday | |
| 4,373,130 A | 2/1983 | Krasborn et al. | |
| 4,509,878 A | 4/1985 | Bryson et al. | |
| 4,679,845 A | 7/1987 | Detampel et al. | |
| 4,765,672 A | 8/1988 | Weaver | |
| 4,822,098 A | * 4/1989 | Vogt et al. | 296/76 |
| 4,874,198 A | 10/1989 | Roller | |
| 4,893,865 A | 1/1990 | McClain et al. | |
| 5,076,632 A | 12/1991 | Surratt | |
| 5,108,146 A | 4/1992 | Sheppard | |
| 5,251,954 A | 10/1993 | Vande Kopple et al. | |
| 5,352,010 A | 10/1994 | Brodie et al. | |
| 5,451,090 A | 9/1995 | Brodie et al. | |
| 5,561,882 A | * 10/1996 | Eustache et al. | 296/192 |
| 5,669,986 A | 9/1997 | Buchanan, Jr. et al. | |
| 5,692,953 A | 12/1997 | Bell et al. | |
| 5,836,042 A | * 11/1998 | Funk et al. | 15/250.3 |
| 5,946,763 A | 9/1999 | Egner-Walter et al. | |
| 5,964,490 A | 10/1999 | Schroeder et al. | |
| 6,024,803 A | 2/2000 | Buchanan, Jr. et al. | |
| 6,298,519 B1 | 10/2001 | Berge et al. | |

FOREIGN PATENT DOCUMENTS

EP 0 099 115 A2 1/1984

\* cited by examiner

*Primary Examiner*—Dennis H. Pedder
(74) *Attorney, Agent, or Firm*—J. Gordon Lewis

(57) ABSTRACT

An apparatus for supporting an assembly including a wiper drive motor, a linkage, and a pair of wiper arm drive shafts with respect to a windshield of a motor vehicle to be cleaned includes a molded cowl/plenum member having two integral bosses extending therethrough. Each boss receives a wiper arm drive shaft extending therethrough. The cowl/plenum member also includes an integral wiper drive motor mount. At least one bearing is associated with each boss for establishing the proper orientation of a rotational axis of each drive shaft to be mounted through the integral bosses. The bearing preferably includes a pair of hat-shaped cylindrical bearings press fit into opposite ends of each boss to define the rotational axis of the drive shaft.

29 Claims, 5 Drawing Sheets

INTEGRATED LOWER COWL/PLENUM AND WIPER DRIVE MODULE

FIELD OF THE INVENTION

The present invention relates to an integral lower cowl/plenum and wiper drive module for supporting a windshield wiper drive assembly without the need for a separate frame structure to maintain the desired orientation of the rotational axes of the wiper arm drive shafts with respect to the windshield to be wiped.

BACKGROUND OF THE INVENTION

A typical windshield wiper drive module is shown and described in FIG. 2 of U.S. Pat. No. 5,946,763. The disclosed windshield wiper system conventionally includes a so-called tubular frame that carries the two wiper drive shafts and a motor carrying plate on which the wiper motor is fastened. The wiper drive shafts of the system are able to carry out a rotational pendulum motion via a linkage that is driven by the motor. An electrical plug connection serves for triggering the wiper motor via corresponding control elements, i.e., a steering column switch, a rain sensor, or the like. The windshield wiper system conventionally requires a tubular frame system with four fastening points at which the windshield wiper system is fastened to the motor vehicle body by means of screws. These fastening points are simultaneously used for connecting the windshield wiper system and the receptacle into a cowl plenum module. Consequently, the cowl plenum module is provided with through-openings of corresponding shape at the locations of the fastening points. The cowl plenum module is conventionally provided with two additional through-openings in order to insert the free ends of the wiper drive shafts from below the cowl plenum module. The windshield wiper system and the cowl plenum module are connected into an assembly at the fastening points by means of corresponding screws. The tubular frame system supporting the windshield wiper motor, wiper drive shafts, and connecting linkages conventionally provides the structural rigidity and mounting orientation of the wiper drive shafts in the desired configuration with respect to the wiper motor and the tubular frame is directly connected to the motor vehicle body to maintain the desired orientation. The cowl plenum module conventionally provided no orientation function or critical support function for the windshield wiper motor, drive shafts, and linkage assembly.

SUMMARY OF THE INVENTION

It would be desirable in the present invention to provide an integral cowl/plenum and wiper drive assembly, where the cowl/plenum structure completely replaces the separate tubular support structure previously required for the wiper drive assembly. It would be desirable in the present invention to mount the wiper drive motor directly to plastic bosses formed integral with the cowl/plenum structure to eliminate the conventional requirement of separate rubber grommets used for isolation mounting of the wiper drive motor and the tubular frame structure previously required. It would be desirable in the present invention to provide the cowl/plenum structure with a water management area allowing the wiper motor drive mounting area to be enclosed and maintained in a separate dry area. It would be desirable in the present invention to simplify connection of the water drainage tube to the cowl/plenum structure by moving the mounting surface from a blind view surface to a visible mounting surface, and/or reducing the three attachment points previously used to only two attachment points, and/or providing a locating lip on the cowl/plenum structure to locate the drain tube during the fastening operation. It would be desirable in the present invention to provide a motor harness attachment integral with the cowl/plenum structure. It would be desirable in the present invention to provide an air filter receptacle integral with the cowl plenum structure. It would be desirable to provide an integral security sensor bracket with the cowl/plenum structure. It would be desirable to provide the cowl/plenum structure with sufficient rigidity to prevent sagging of the plastic cowl/plenum structure over time and over a range of anticipated temperature exposure in order to support a hood seal in sealing engagement with the lower surface of a hood in a closed position. It would be desirable to provide a cowl/plenum structure formed of a thermoplastic injection molded material, where the thermoplastic injection molded material is 45% glass filled. It would be desirable to provide the cowl/plenum structure with sufficient rigidity to withstand all wiper system functional loads/forces created during operation. It would be desirable in the present invention to optionally mount sound deadening material to the integral cowl/plenum structure to reduce airborne noise from the engine compartment migrating into the passenger compartment. It would be desirable in the present invention to provide integral pivot bosses with the cowl/plenum structure for receiving pressed in bearings for aligning the windshield wiper drive shafts with respect to the cowl/plenum structure.

An apparatus according to the present invention provides an integral cowl/plenum structure for supporting a wiper drive motor, linkage, and wiper arm drive shafts without the need for a separate tubular support frame extending between the wiper drive motor and wiper arm drive shafts as is conventional. The present invention reduces the weight of the conventional plenum and wiper drive motor assembly. The present invention also reduces the cost of the assembly, and reduces the number of parts associated with the assembly. The integral cowl/plenum structure according to the present invention permits mounting the wiper drive motor directly to plastic bosses formed integral with the cowl/plenum structure. The cowl/plenum structure includes integral bosses for receiving the wiper arm drive shafts extending therethrough. The integral drive shaft bosses provide proper orientation of the rotational axes of the wiper drive shafts with respect to the windshield to be cleaned. The proper orientation of the wiper arm shafts is provided by press fitting bearings in opposite ends of the integral wiper arm drive shaft bosses to provide the proper orientation of the rotational axis of the wiper arm drive shaft. In the preferred process of manufacturing the integral cowl/plenum structure according to the present invention, the plastic molded integral structure is placed in a bearing mounting fixture while cooling where alignment shafts extend through the integral wiper arm drive shaft bosses for guiding the bearings during insertion into the opposing ends of the bosses while maintaining the desired orientation of the rotational axis as the integral cowl/plenum structural part continues to cool.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
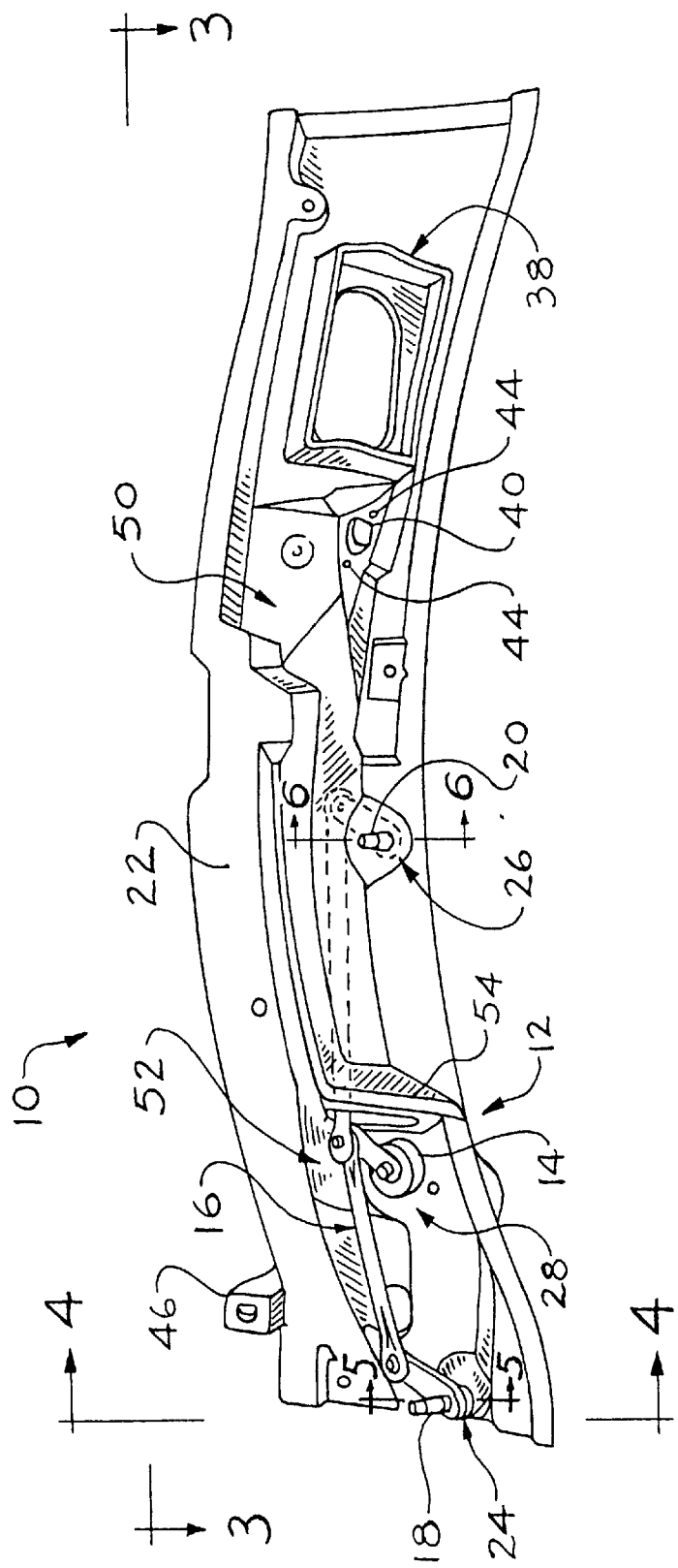
FIG. 1 is a top view of an integral cowl/plenum and wiper drive motor assembly according to the present invention.

Referring now to FIGS. 1 through 4, an apparatus 10 according to the present invention provides an integrated cowl plenum and wiper drive motor assembly. The apparatus 10 according to the present invention reduces weight, reduces the number of parts, and reduces the cost when compared to the conventional assembly. The apparatus 10 according to the present invention supports an assembly 12 including a wiper drive motor 14, a linkage 16, and a pair of wiper arm drive shafts 18, 20 with respect to a windshield of a motor vehicle to be cleaned. The apparatus 10 includes a cowl/plenum member 22 having two integral bosses 24, 26 extending therethrough. Each boss 24, 26 receives a corresponding wiper arm drive shaft 18, 20 extending therethrough. The cowl/plenum member 22 also includes an integral wiper drive motor mount 28. At least one bearing 30, 32, 34, 36 is associated with each boss 24, 26 for establishing proper orientation of a rotational axis of each drive shaft 18, 20 to be mounted through the integral bosses 24, 26.

Preferably, at least one bearing 30, 32, 34, 36 is press fit into each boss 24, 26. In the most preferred configuration, the bearing includes a pair of hat-shaped cylindrical bearings (30, 32; 34, 36) press fit into opposite ends of the corresponding bosses (24; 26) to define the rotational axis of the corresponding drive shafts (18; 20) to be mounted therein.

The cowl/plenum member 22 is preferably formed of a thermoplastic injection molded material. In the most preferred embodiment, the thermoplastic injection molded material is approximately 45% glass filled. After the cowl/plenum member 22 is molded with an integrally formed boss 24, 26 in the plastic molded support member 22, the part is ejected from the mold while still cooling. The molded support member 22 is placed in a fixture having guide rods extending through the integrally formed boss 24, 26 for guiding press fit insertion of the pair of hat-shaped cylindrical bearings (30, 32; 34, 36) into opposite ends of the boss (24; 26) to define the rotational axis of the corresponding shaft (18; 20) to be supported therein. Then at least one bearing (30, 32; 34, 36) associated with the integral boss (24; 26) is press fit into the molded support member 22 while still in the process of cooling to ambient temperature. This method or process of manufacturing the molded support member ensures proper orientation of the rotational axis of the rotatable shaft 18, 20 to be mounted through the corresponding boss 24, 26.

The wiper drive motor 14 is preferably mounted directly to the cowl/plenum support member 22 without requiring the additional use of rubber grommets. The cowl/plenum member 22 can include an integral air filter receptacle 38. A drain tube mount 40 can be integrally formed with the cowl/plenum member 22. In the preferred embodiment, the drain tube mount 40 is positioned on a visible surface for ease of assembly. The drain tube mount 40 includes a locating lip 42 for locating the drain tube 40 with respect to the cowl/plenum member 22, and reduces the number of mounting fasteners 44 to only a pair of fasteners. If desired, an integral security sensor bracket 46 can be formed as part of the molded cowl/plenum support member 22. A wiper drive motor harness attachment 48 can also be integrally formed with the molded cowl/plenum member 22.

As best seen in FIG. 1, the cowl/plenum member 22 is molded to define a water management area 50 and a dry area 52. The water management area 50 and dry area 52 are separated from one another by a sealing ridge 54. In the preferred embodiment, the wiper motor mount 28 is located in the dry area 52.

Figure 2:
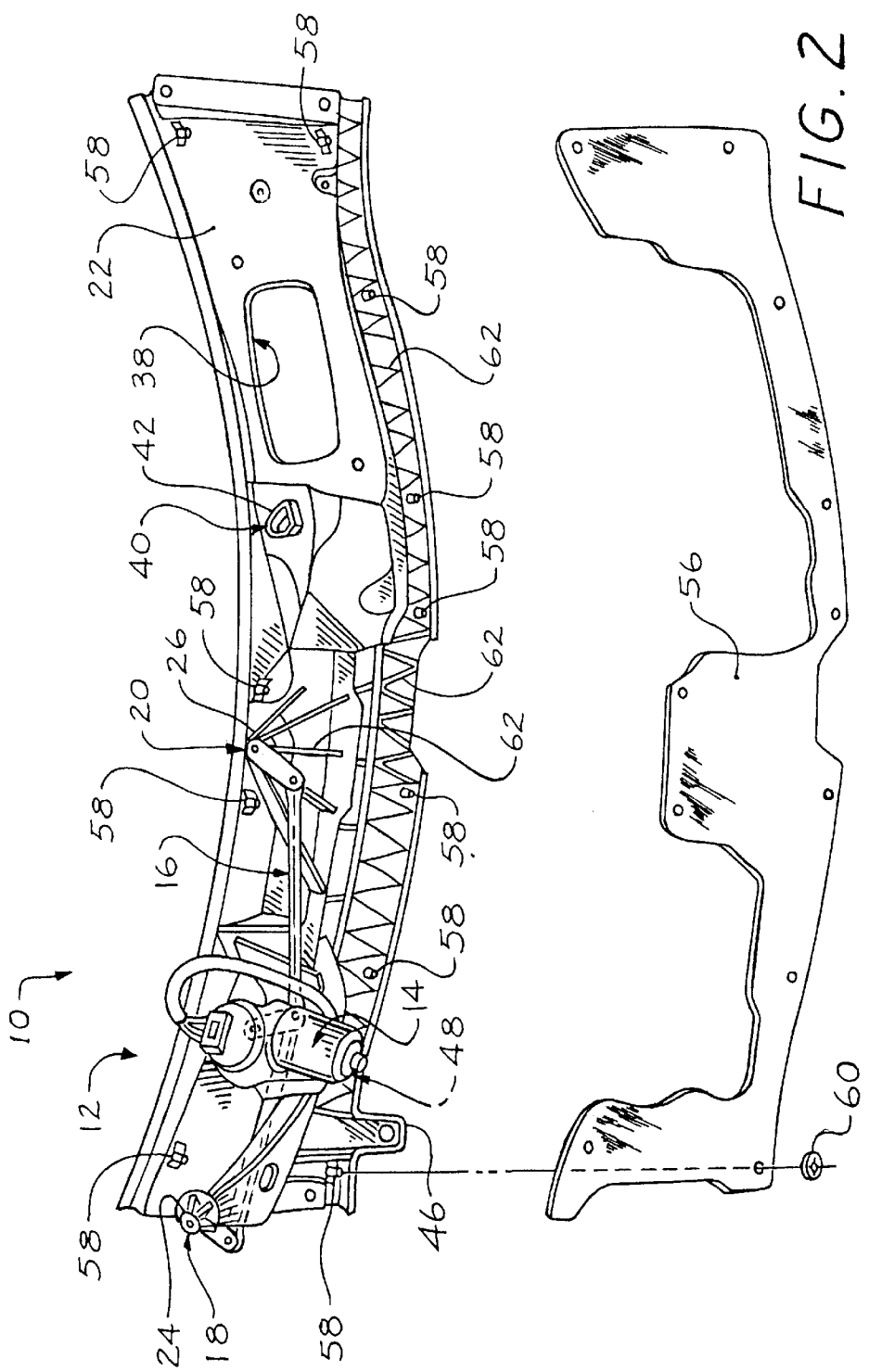
FIG. 2 is a bottom view of the integral cowl/plenum and wiper drive motor assembly of FIG. 1 with optional sound deadening attachment.
Figure 3:
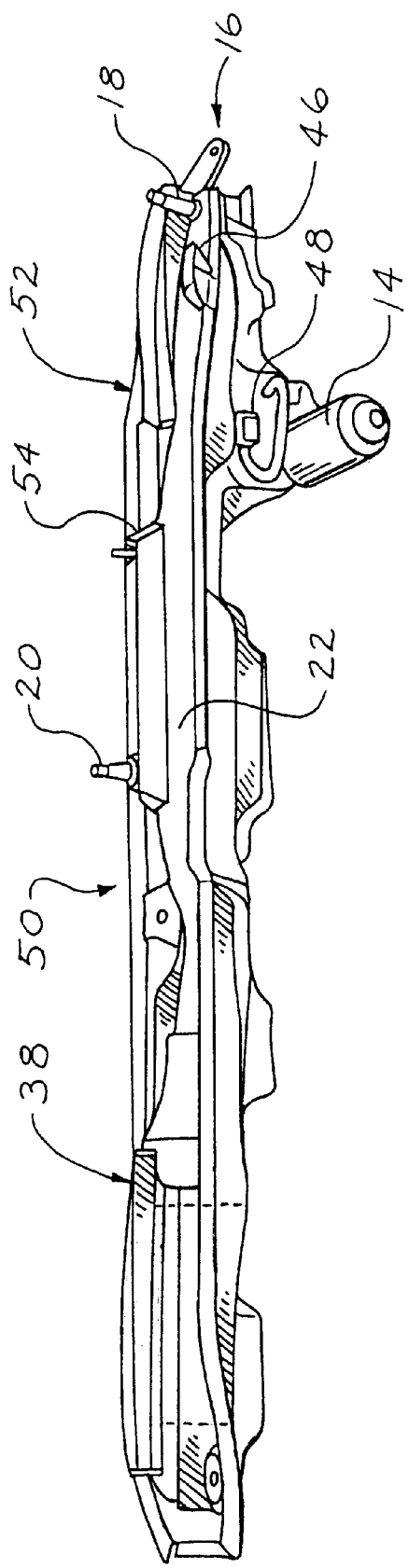
FIG. 3 is a front view of the integral cowl/plenum and wiper drive motor assembly taken as shown in FIG. 1.
Figure 4:
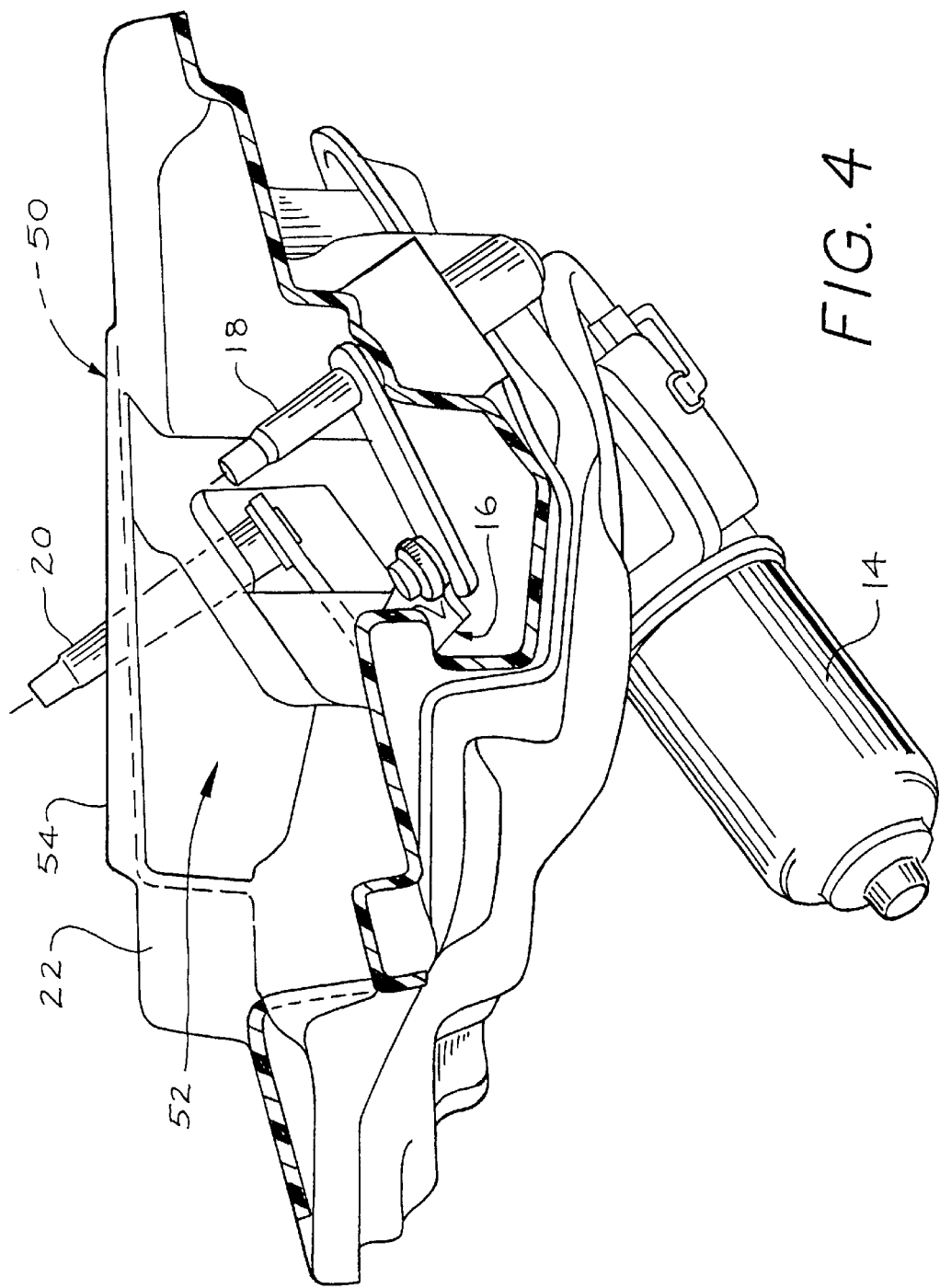
FIG. 4 is a side elevational view of the integral cowl/plenum and wiper drive motor assembly of FIGS. 1 and 2.
Figure 5:
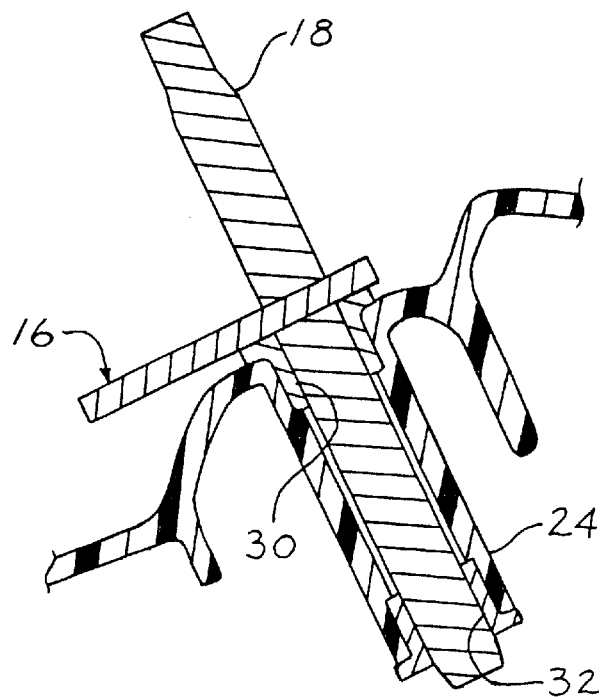
FIG. 5 is a detailed cross-sectional view of an integral wiper arm drive shaft boss of the cowl/plenum and wiper drive motor assembly taken as shown in FIG. 1.
Figure 6:
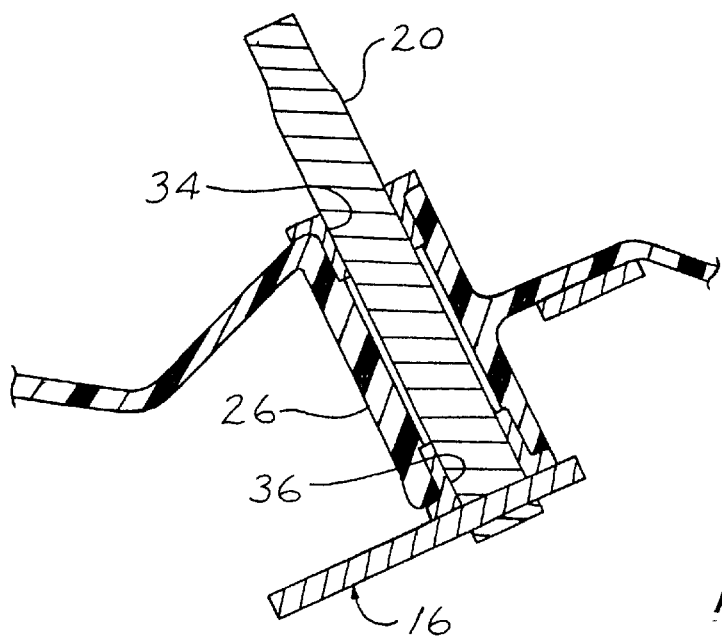
FIG. 6 is a detailed cross-sectional view of a wiper arm drive shaft integral boss of the cowl/plenum and wiper drive motor assembly taken as shown in FIG. 1.

As best seen in FIG. 2, a layer 56 of sound deadening material is attachable to at least a portion of the cowl/plenum member 22. The sound deadening material inhibits the transmission of airborne noise from the engine compartment into the passenger compartment of the motor vehicle. The layer 56 of sound deadening material can be attached to outwardly extending plastic posts 58 formed integrally with the cowl/plenum member 22. A self locking retainer clip 60 can be pressed onto each post 58 for holding the sound deadening material layer 56 between the retainer 60 and the cowl/plenum member 22. The cowl/plenum member 22 can support a first seal, such as a foam seal adjacent the windshield of the motor vehicle, and a second seal, such as a bulb seal for engagement with the lower surface of the hood when in a closed position.

The integrated cowl/plenum includes direct mounts for the wiper drive motor and mounts for the wiper arm pivot shafts. The integration of the cowl/plenum member according to the present invention saves approximately 1¾ pounds of weight while reducing costs. The cowl/plenum member 22 according to the present invention provides more accurate wiper arm pivot shaft mounts; more particularly, the cowl/plenum member 22 according to the present invention can provide an improvement of 30% to 70% in shaft angle control. The present invention provides consistent wipe angles in the "as molded" form with molded thickness of the part in a range of between approximately 2 ½ millimeters to 3 ½ millimeters inclusive.

The preferred material for the molded support member 22 is thermoplastic polyester resin. One such suitable thermoplastic polyester resin is commercially available under the trade name PETRA PET available from Honeywell. PETRA PET thermoplastic polyester resin contain uniformly dispersed glass fibers or mineral/glass fiber combinations in polyethylene terephthalate (PET) resin that has been specially formatted for rapid crystallization during the injection molding process.

The cowl/plenum member 22 includes reinforcing ridges or webs 62 to provide sufficient rigidity along the longitudinal length of the member 22 so that deflection in the center of the cowl/plenum member 22 is limited to no more than 4 millimeters. The thermoplastic polyester resin preferably includes between approximately 30% to approximately 45% glass fiber fill; and more preferably approximately 45% glass fiber fill.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for supporting a wiper drive motor, a linkage, and a pair of wiper arm drive shafts with respect to a windshield of a motor vehicle to be cleaned, the apparatus comprising:

a plastic molded, single piece, cowl/plenum member having two integral bosses formed in one piece with the cowl/plenum member each boss for receiving a wiper arm drive shaft extending therethrough; and at least one bearing associated with each boss for establishing proper orientation of a rotational axis of each drive shaft to be mounted through the integral bosses.

2. The apparatus of claim 1 wherein the at least one bearing is press fit into each boss.

3. The apparatus of claim 1 wherein the at least one bearing further comprises two hat-type bearings press fit into opposite ends of the bosses to define the rotational axis of the drive shaft.

4. The apparatus of claim 1 wherein the wiper drive motor is mounted directly to the cowl/plenum member.

5. The apparatus of claim 1 wherein the cowl/plenum member includes an integral air filter receptacle formed therein.

6. The apparatus of claim 1 wherein the cowl/plenum member includes a drain tube mount.

7. The apparatus of claim 6 wherein the drain tube mount accommodates only two apertures for receiving mounting fasteners.

8. The apparatus of claim 6 wherein the drain tube mount includes a locating lip.

9. The apparatus of claim 1 wherein the cowl/plenum member includes an integral security sensor bracket.

10. The apparatus of claim 1 wherein the cowl/plenum member includes an integral wiper drive motor harness attachment.

11. The apparatus of claim 1 wherein the cowl/plenum member includes a water management area and a dry area, and a wiper motor mount is located in the dry area.

12. The apparatus of claim 1 further comprising a layer of sound deadening material attachable to at least a portion of the cowl/plenum member.

13. The apparatus of claim 1 further comprising the cowl/plenum member formed of thermoplastic injection molded material.

14. The apparatus of claim 13 wherein the plastic injection molded material is approximately 45% glass filled.

15. A method for manufacturing an apparatus for supporting a wiper drive motor, a linkage, and a pair of wiper arm drive shafts with respect to a windshield of a motor vehicle to be cleaned, the method comprising the steps of:

plastic molding a single piece cowl/plenum member having two integral bosses formed in one piece with the cowl/plenum member, each boss for receiving a wiper arm drive shaft extending therethrough, and an integral wiper drive motor mount; and associating at least one bearing with each boss of the cowl/plenum member for establishing proper orientation of a rotational axis of each drive shaft to be mounted through the integral bosses.

16. The method of claim 15 wherein the associating step further comprises the step of press fitting at least one bearing into each boss.

17. The method of claim 15 wherein the associating step further comprises the step of press fitting two hat-type bearings into opposite ends of the bosses to define the rotational axis of the drive shaft.

18. The method of claim 15 further comprising the step of directly mounting the wiper drive motor to the cowl/plenum member.

19. The method of claim 15 wherein the molding step further comprises the step of integrally forming an air filter receptacle in the cowl/plenum member.

20. The method of claim 15 wherein the molding step further comprises the step of integrally forming a drain tube mount in the cowl/plenum member.

21. The method of claim 20 wherein the drain tube mount accommodates only two apertures for receiving mounting fasteners.

22. The method of claim 20 wherein the integrally forming step further comprises the step of forming a locating lip in the drain tube mount.

23. The method of claim 15 wherein the molding step further comprises the step of integrally forming a security sensor bracket in the cowl/plenum member.

24. The method of claim 15 wherein the molding step further comprises the step of integrally forming a wiper drive motor harness attachment in the cowl/plenum member.

25. The method of claim 15 wherein the molding step further comprises the step of integrally forming a water management area and a dry area in the cowl/plenum member, and locating the wiper motor mount in the dry area.

26. The method of claim 15 further comprising the step of attaching a layer of sound deadening material to at least a portion of the cowl/plenum member.

27. The method of claim 15 wherein the molding step further comprises forming the cowl/plenum member of thermoplastic injection molded material.

28. The method of claim 15 wherein the thermoplastic injection molded material is approximately 45% glass filled.

29. An apparatus manufactured according to the method of claim 15 for supporting a wiper drive motor, a linkage, and a pair of wiper arm drive shafts with respect to a windshield of a motor vehicle to be cleaned, the apparatus comprising:

a plastic molded, single piece, cowl/plenum member having two integral bosses formed in one piece with the cowl/plenum member, each boss for receiving a wiper arm drive shaft extending therethrough, and an integral wiper drive motor mount; and at least one bearing associated with each boss for establishing proper orientation of a rotational axis of each drive shaft to be mounted through the integral bosses.

* * * * *